US010403946B2

(12) United States Patent
Jalilevand et al.

(10) Patent No.: US 10,403,946 B2
(45) Date of Patent: Sep. 3, 2019

(54) BATTERY CHILLER CONTROL WITH ELECTRONIC EXPANSION DEVICE

(71) Applicant: Ford Global Technologies, LLC, Dearborn, MI (US)

(72) Inventors: Ali Jalilevand, Ann Arbor, MI (US); Jan Xu, Canton, MI (US); Steven L. Lambert, Washington, MI (US); William Stewart Johnston, South Lyon, MI (US); Timothy Van Evans, Ypsilanti, MI (US); Mark C. Evans, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 571 days.

(21) Appl. No.: 15/181,468

(22) Filed: Jun. 14, 2016

(65) Prior Publication Data
US 2017/0358833 A1    Dec. 14, 2017

(51) Int. Cl.
*F25D 23/00* (2006.01)
*H01M 10/663* (2014.01)
(Continued)

(52) U.S. Cl.
CPC ...... *H01M 10/663* (2015.04); *B60H 1/00278* (2013.01); *B60H 1/00385* (2013.01);
(Continued)

(58) Field of Classification Search
CPC ........... H01M 10/663; H01M 2220/20; H01M 10/613; H01M 10/625; H01M 10/63;
(Continued)

(56) References Cited

U.S. PATENT DOCUMENTS 6,481,230 B2 * 11/2002 Kimishima ............ B60H 1/323
62/238.7
9,121,643 B2   9/2015 Schaefer et al.
(Continued)

FOREIGN PATENT DOCUMENTS

JP   2014125111 A  *  7/2014

OTHER PUBLICATIONS

Only one foreign reference is attached which is JP 2014125111A, other attachment: (translation of JP2014125111A); is the translation of JP2014125111A.*

*Primary Examiner* — Edward F Landrum
*Assistant Examiner* — Kamran Tavakoldavani
(74) *Attorney, Agent, or Firm* — David Kelley; Brooks Kushman, P.C.

(57) ABSTRACT

A climate-control system for a vehicle includes a refrigerant subsystem having a chiller and an electronic expansion valve (EXV) arranged to selectively route refrigerant to the chiller. The vehicle further includes a coolant subsystem having conduit arranged to circulate coolant through a traction battery and the chiller. The coolant subsystem further includes a first temperature sensor configured to measure coolant circulating into an inlet side of the chiller and a second temperature sensor configured to measure coolant circulating out of an outlet side of the chiller. A vehicle controller is configured to, in response to the battery exceeding a threshold temperature and cabin air conditioning being requested, command opening of the EXV to a predetermined position and adjust the position based on a measured coolant temperature difference between the first temperature sensor and the second temperature sensor.

19 Claims, 4 Drawing Sheets

(51) Int. Cl.
*H01M 10/613* (2014.01)
*H01M 10/625* (2014.01)
*H01M 10/63* (2014.01)
*B60H 1/00* (2006.01)
*B60H 1/32* (2006.01)

(52) U.S. Cl.
CPC ..... *B60H 1/00807* (2013.01); *B60H 1/00885* (2013.01); *B60H 1/00899* (2013.01); *B60H 1/323* (2013.01); *H01M 10/613* (2015.04); *H01M 10/625* (2015.04); *H01M 10/63* (2015.04); *B60H 2001/00307* (2013.01); *B60H 2001/00949* (2013.01); *B60H 2001/00957* (2013.01); *H01M 2220/20* (2013.01)

(58) Field of Classification Search
CPC ............ B60H 1/00278; B60H 1/00385; B60H 1/00807; B60H 1/00885; B60H 1/323; B60H 2001/00957; B60H 1/00899; B60H 2001/00949
See application file for complete search history.

(56) References Cited

U.S. PATENT DOCUMENTS

| | | |
|---|---|---|
| 2009/0249807 A1 | 10/2009 | Nemesh et al. |
| 2012/0205088 A1* | 8/2012 | Morisita ............ B60H 1/00921 165/202 |
| 2013/0152611 A1 | 6/2013 | Furll et al. |
| 2013/0175022 A1 | 7/2013 | King et al. |
| 2015/0013367 A1 | 1/2015 | Carpenter |
| 2016/0031340 A1 | 2/2016 | Porras |

\* cited by examiner

BATTERY CHILLER CONTROL WITH ELECTRONIC EXPANSION DEVICE

TECHNICAL FIELD

The present disclosure relates to a control strategy and method for operating a battery chiller associated with an air-conditioning system of a vehicle.

BACKGROUND

The need to reduce fuel consumption and emissions in automobiles and other vehicles is well known. Vehicles are being developed that reduce reliance or completely eliminate reliance on internal-combustion engines. Electric and hybrid vehicles are one type of vehicle currently being developed for this purpose. Electric and hybrid vehicles include a traction motor that is powered by a traction battery. Traction batteries require a thermal-management system to thermally regulate the temperature of the battery cells.

SUMMARY

According to one embodiment, a climate-control system for a vehicle includes a refrigerant subsystem having a chiller and an electronic expansion valve (EXV) arranged to selectively route refrigerant to the chiller. The vehicle further includes a coolant subsystem having conduit arranged to circulate coolant through a traction battery and the chiller. The coolant subsystem further includes a first temperature sensor configured to measure coolant circulating into an inlet side of the chiller and a second temperature sensor configured to measure coolant circulating out of an outlet side of the chiller. A vehicle controller is configured to, in response to the battery exceeding a threshold temperature and cabin air conditioning being requested, command opening of the EXV to a predetermined position and adjust the position based on a measured coolant temperature difference between the first temperature sensor and the second temperature sensor. The position of the EXV may be gradually opened from a closed position to the predetermined position over a predetermined duration of time in response to the opening command.

According to another embodiment, a vehicle includes a refrigerant system having a chiller and an electronic expansion valve (EXV) arranged to selectively route refrigerant to the chiller, and a coolant system arranged to circulate coolant through a traction battery and the chiller. A vehicle controller is configured to, in response to the EXV being open and cabin air conditioning being requested, adjust an opening of the EXV based on a difference between a measured chiller capacity and a target chiller capacity.

According to yet another embodiment, a method of controlling a vehicle climate system having a chiller arranged to transfer heat between a refrigerant subsystem and a battery-coolant subsystem is presented. The method includes opening an electronic expansion valve, associated with the chiller and configured to control refrigerant to the chiller, to a predetermined position in response to a battery exceeding a threshold temperature. The method further includes adjusting the position based on a measured coolant temperature difference between chiller inlet and outlet coolant temperatures.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
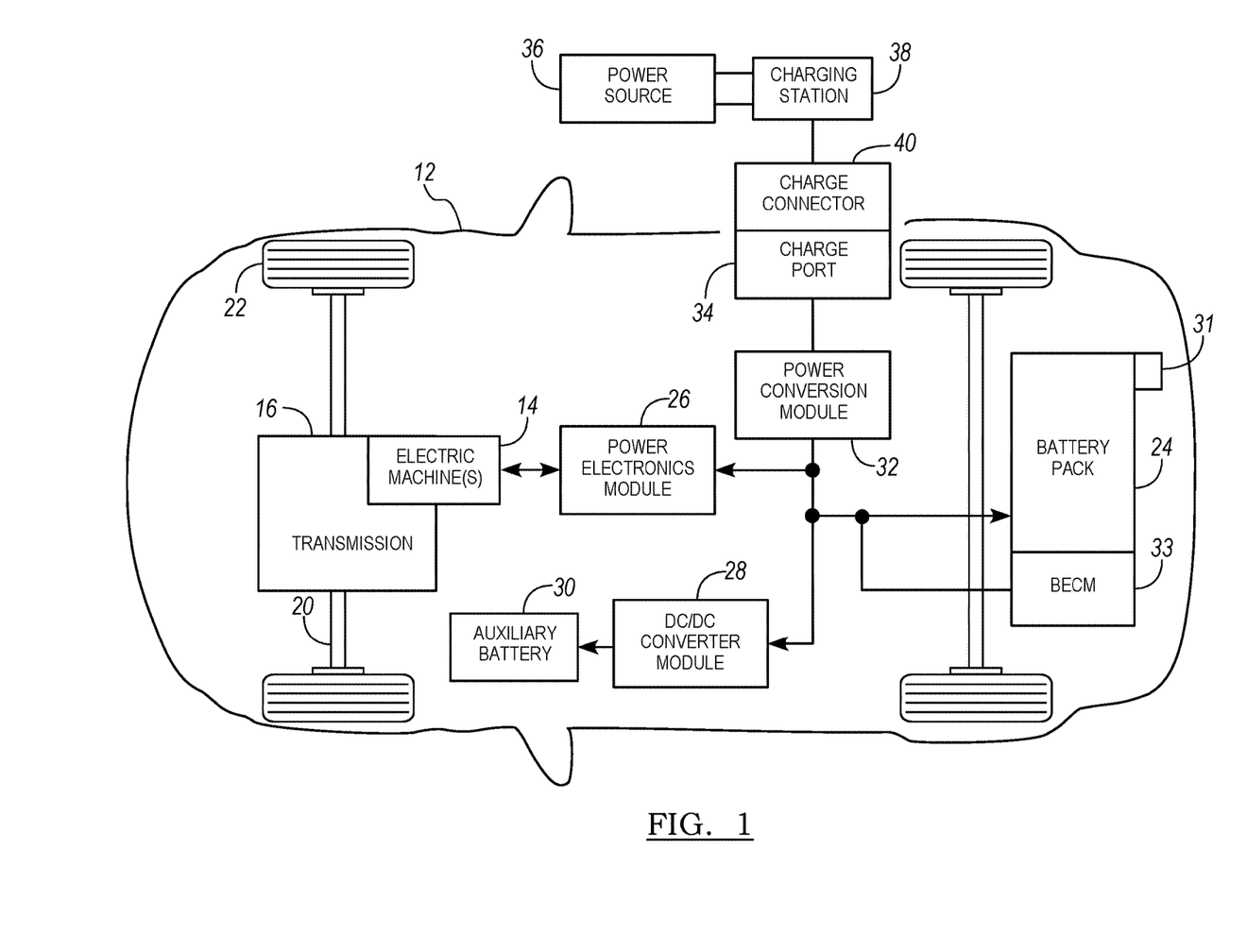
FIG. 1 is a schematic diagram of an example electric vehicle.

FIG. 1 depicts a schematic of an example battery-electric vehicle (BEV). Certain embodiments, however, may also be implemented within the context of hybrid-electric vehicles. The vehicle 12 includes one or more electric machines 14 mechanically connected to a transmission 16. The electric machines 14 may be capable of operating as a motor or a generator. If the vehicle is a hybrid-electric vehicle, the transmission 16 is mechanically connected to an engine (not shown). The transmission 16 is mechanically connected to the wheels 22 via a driveshaft 20. The electric machines 14 can provide propulsion and deceleration capability. The electric machines 14 also act as generators and can provide fuel economy benefits by recovering energy through regenerative braking.

A traction battery or battery pack 24 stores energy that can be used by the electric machines 14. The traction battery 24 typically provides a high-voltage direct current (DC) output from one or more battery cell arrays, sometimes referred to as battery cell stacks, within the traction battery 24. The battery cell arrays may include one or more battery cells.

The battery cells (such as a prismatic, pouch, cylindrical, or any other type of cell), convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle.

Different battery pack configurations are available to address individual vehicle variables including packaging constraints and power requirements. The battery cells may be thermally regulated with a thermal management system. Examples of thermal management systems include air-cooling systems, liquid-cooling systems, and a combination of air and liquid systems.

The traction battery 24 may be electrically connected to one or more power electronics modules 26 through one or more contactors (not shown). The one or more contactors isolate the traction battery 24 from other components when opened, and connect the traction battery 24 to other components when closed. The power-electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power-electronics module 26 may convert the DC voltage to a three-phase AC voltage as required by the electric machines 14. In a regenerative mode, the power-electronics module 26 may convert the three-phase AC voltage from the electric machines 14 acting as generators to the DC voltage required by the traction battery 24.

In addition to providing energy for propulsion, the traction battery 24 may provide energy for other vehicle electrical systems. A typical system may include a DC/DC converter 28 that converts the high-voltage DC output of the traction battery 24 to a low-voltage DC supply that is compatible with other vehicle components. Other high-voltage loads, such as air-conditioning compressors and electric heaters, may be connected directly to the high-voltage supply without the use of a DC/DC converter module 28. In a typical vehicle, the low-voltage systems are electrically connected to the DC/DC converter and an auxiliary battery 30 (e.g., a 12 volt battery).

A battery energy control module (BECM) 33 may be in communication with the traction battery 24. The BECM 33 may act as a controller for the traction battery 24 and may also include an electronic monitoring system that manages temperature and state of charge for each of the battery cells. The traction battery 24 may have a temperature sensor 31 such as a thermistor or other temperature gauge. The temperature sensor 31 may be in communication with the BECM 33 to provide temperature data regarding the traction battery 24. The BECM 33 may be part of a larger vehicle-control system that includes one or more additional controllers.

The vehicle 12 may be recharged by an external power source 36. The external power source 36 may be a connection to an electrical outlet connected to the power grid or may be a local power source (e.g. solar power). The external power source 36 is electrically connected to a vehicle charging station 38. The charger 38 may provide circuitry and controls to regulate and manage the transfer of electrical energy between the power source 36 and the vehicle 12. The external power source 36 may provide DC or AC power to the charger 38. The charger 38 may have a charge connector 40 for plugging into a charge port 34 of the vehicle 12. The charge port 34 may be any type of port configured to transfer power from the charger 38 to the vehicle 12. The charge port 34 may be electrically connected to a charger or on-board power-conversion module 32. The power-conversion module 32 may condition the power supplied from the charger 38 to provide the proper voltage and current levels to the traction battery 24. The power-conversion module 32 may interface with the charger 38 to coordinate the delivery of power to the vehicle 12. The charger connector 40 may have pins that mate with corresponding recesses of the charge port 34. In other embodiments, the charging station may be an induction charging station. Here, the vehicle may include a receiver that communicates with a transmitter of the charging station to wirelessly receive electric current.

The various components discussed may have one or more controllers to control and monitor the operation of the components. The controllers may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" refers to one or more controllers.

Figure 2:
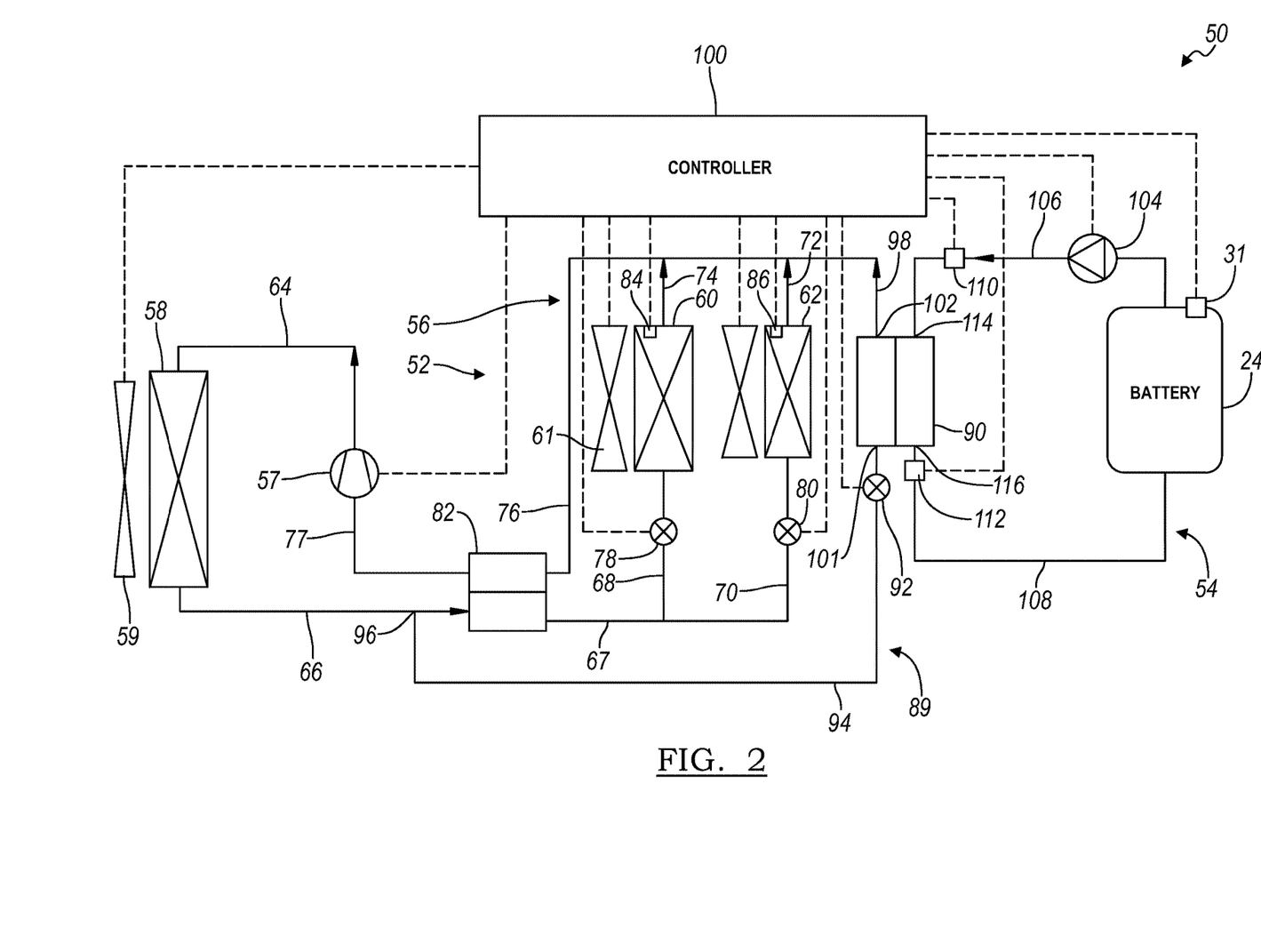
FIG. 2 is a schematic diagram of a climate-control system of a vehicle.

The traction battery 24, the passenger cabin, and other vehicle components are thermally regulated with one or more thermal-management systems. Example thermal-management systems are shown in the figures and described below. Referring to FIG. 2, the vehicle 12 includes a climate-control system 50 having at least a refrigerant subsystem 52 and battery-coolant subsystem 54. Portions of the various thermal-management systems may be located within various areas of the vehicle, such as the engine compartment and the cabin, for example.

The refrigerant subsystem 52 provides air conditioning of the cabin during some operating modes, and also cools and/or heats the battery 24 during some operating modes. The refrigerant subsystem 52 may be a vapor-compression heat pump that circulates a refrigerant transferring thermal energy to various components of the climate-control system 50. The refrigerant subsystem 52 may include a cabin loop 56 having a compressor 57, an exterior heat exchanger 58 (e.g., condenser), a first interior heat exchanger 60 (e.g., front evaporator), a second interior heat exchanger 62 (e.g., rear evaporator), an accumulator, fittings, valves, expansion devices and other components commonly associated with refrigerant subsystems. The evaporators may each have an associated blower 61. The condenser 58 may be located behind the grille near the front of the vehicle, and the evaporators may be disposed within one or more HVAC housings. It is to be understood that heat exchangers labeled as "condenser" may also act as an evaporator if the refrigerant subsystem 52 is a heat pump. A fan 59 may circulate air over the condenser 58.

The cabin loop 56 components are connected in a closed loop by a plurality of conduits, tubes, hoses or lines. For example, a first conduit 64 connects the compressor 57 and the condenser 58 in fluid communication, a second conduit 66 connects the condenser 58 to the intermediate heat exchanger 82, and conduit 67 connects the evaporators 60, 62 in fluid communication with the heat exchanger 82. The front evaporator 60 is connected with conduit 67 via conduit 68, and the rear evaporator 62 is connected with conduit 67 via conduit 70. A first expansion device 78 is disposed on conduit 68 and controls refrigerant flow to the front evaporator 60. The expansion device is configured to change the pressure and temperature of the refrigerant in the subsystem 52. The expansion device 78 may be a thermal expansion valve with an electronically controllable shut-off feature or may be an electronic expansion valve. A second expansion device 80 is disposed on conduit 70 and controls refrigerant flow to the rear evaporator 62. The second expansion device 80 may be similar to the first expansion device. The front evaporator 60 is connected to a return conduit 76 via conduit 74, and the rear evaporator 62 is connected with return conduit 76 via conduit 72. The return conduit 76 connects between the heat exchanger 82 and the evaporators. Conduit 77 connects between the heat exchanger 82 and the compressor 57. The intermediate heat exchanger 82 is optional.

The climate-control system 50 includes a controller 100 in electronic communication with several of the climate-control components. The dashed lines in FIG. 2 illustrate electrical connections between the controller 100 and the components. The controller may interface with the various components via a data bus or dedicated wires as described above. The evaporators 60, 62 each include a temperature sensor 84 and 86, respectively, that is configured to send a signal indicating the temperature of the corresponding evaporator to the controller 88. Using these temperature signals, and other signals, the controller 88 can determine the operating conditions of the climate-control system 50.

The refrigerant subsystem 52 also includes a battery loop 89 having a chiller 90 and a third expansion device 92. The battery loop 89 may include a supply conduit 94 connected to conduit 66 at fitting 96 and connected to the refrigerant-inlet side 101 of the chiller 90. The expansion device 92 may be on the supply conduit 94. The expansion device 92 is configured to change the pressure and temperature of the refrigerant flowing therethrough. The expansion device may be an electronic expansion valve (EXV) having a valve that modifies a size of the opening within the EXV. The EXV may include an electronic actuator (e.g., stepper motor) configured to actuate the valve to increase or decrease the size of the opening. The actuator is controlled by the controller 100. The controller 100 may instruct the actuator to position the expansion device in a wide-open position, a fully closed position, or a throttled position. The throttled position is a partially open position where the controller modulates the size of the valve opening to regulate flow through the expansion device. The controller 100 and expansion device may be configured to continuously or periodically modulate the throttled position in response to system operating conditions. By changing the opening within the expansion device, the controller can regulate flow, pressure, temperature, and state of the refrigerant as needed. A return conduit 98 connects the battery chiller 90 to the cabin loop 56. The return conduit 98 is connected to the refrigerant-outlet side 102 of the chiller at one end and is connect with conduit 76 at the other.

The vehicle also includes a battery thermal-management system that operates in a plurality of different modes, such as battery-heating mode or battery-cooling mode. The battery thermal-management system includes a battery-coolant subsystem 54 (shown) that dissipates heat to the refrigerant subsystem 52 via the chiller 90, and a radiator loop (not shown) that dissipates heat to the ambient air via a radiator. These two loops may operate in tandem or independently of each other depending upon the battery cooling requirements, the ambient air temperature, and other factors.

The battery-coolant subsystem 54 connects the traction battery 24 and the chiller 90 in fluid communication. The subsystem 54 includes a pump 104 disposed on a first conduit 106 that connects between the battery 24 and the coolant-inlet side 114 of the chiller 90. A second conduit 108 connects between the coolant-outlet side 116 and the battery 24. A coolant inlet temperature sensor 110 is disposed on conduit 106 near the inlet side 114. The sensor 110 is configured to output a signal to the controller 100 indicating a temperature of the coolant circulating into the chiller 90. A coolant outlet temperature sensor 112 is disposed on conduit 108 near the outlet side 116. The sensor 112 is configured to output a signal to the controller 100 indicating a temperature of the coolant exiting the chiller 90.

The battery chiller 90 may have any suitable configuration. For example, the chiller 90 may have a plate-fin, tube-fin, or tube-and-shell configuration that facilitates the transfer of thermal energy without mixing the heat-transfer fluids in the coolant subsystem 54 and the refrigerant subsystem 52.

In systems in which the battery chiller is in fluid communication with a cabin AC system (such as refrigerant subsystem 52), a potential for negatively affecting the temperature of the cabin air is possible if the AC system does not have enough capacity to cool both the cabin and the battery at their respective loads. For example, on a hot day, simultaneously cooling the battery and the passenger cabin via the AC system may cause the outlet temperature of the cabin evaporator to increase beyond a target temperature, which causes the air blowing into the cabin to be warmer than that requested by the driver. The occupants of the cabin may find it dissatisfying when the cabin temperature is not conforming with the demand temperature. As such, carmakers must choose between satisfying cabin demands versus satisfying battery demands in situations in which the combined load exceeds the capacity.

In one embodiment, the system is designed to balance the cabin demand and the battery demand. Here, the controller is configured to determine a capacity of the AC system to accept battery heat (referred herein as "chiller capacity"), and based on the chiller capacity, route an appropriate amount of refrigerant through the chiller 90 in order to provide that capacity. In the illustrated embodiment, the EXV 92 is used to control the percentage of refrigerant flowing to the chiller 90 versus the percentage of coolant bypassing the chiller via conduits 68 or 70. Depending upon the conditions of the cabin AC system 52, the EXV 92 may send anywhere between zero and 100 percent of the refrigerant to the chiller.

If no chiller capacity is available, the battery-coolant system can attempt to cool the battery using a radiator in conjunction with a fan. In some instances, the radiator and fan may be unable to achieve a sufficiently low battery coolant temperature for a given battery load. To prevent overheating, the controller may power limit the battery to prevent overheating.

The chiller capacity is the amount of thermal energy passing between the refrigerant subsystem 52 and the coolant subsystem 54 within the chiller. The chiller capacity may be calculated using equation 1: $Q = \dot{m} \cdot C_p (|T_{in} - T_{out}|)$, where $\dot{m}$ is the flow rate of the coolant, $C_p$ is the specific heat, $T_{out}$ is the temperature of the coolant exiting the chiller, and $T_{in}$ is the temperature of the coolant entering the chiller. A target value of chiller capacity can be determined by a plurality of different methods depending upon the design philosophy. For example, if the passenger cabin is prioritized, then the target value for the chiller capacity is determined by the refrigerant-subsystem capacity minus the sum of all evaporator capacities. Alternatively, the chiller capacity could be set based on battery cooling requirements, or may be set based on a capacity known to not increase the evaporator temperature beyond a threshold value. For example, the refrigerant subsystem 52 may have a total capacity of 5000 Watts (W), and the chiller capacity may be set at 1000 W, which has been determined by vehicle testing not to increase the evaporator temperature beyond a threshold value even during high cabin A/C loads. Of course, these values are not limiting and will vary depending on the refrigerant subsystem. The controller may contain one or more lookup tables having a plurality of different chiller capacities that are used during different operating conditions.

Control logic or functions performed by controller 100 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 100. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 3:
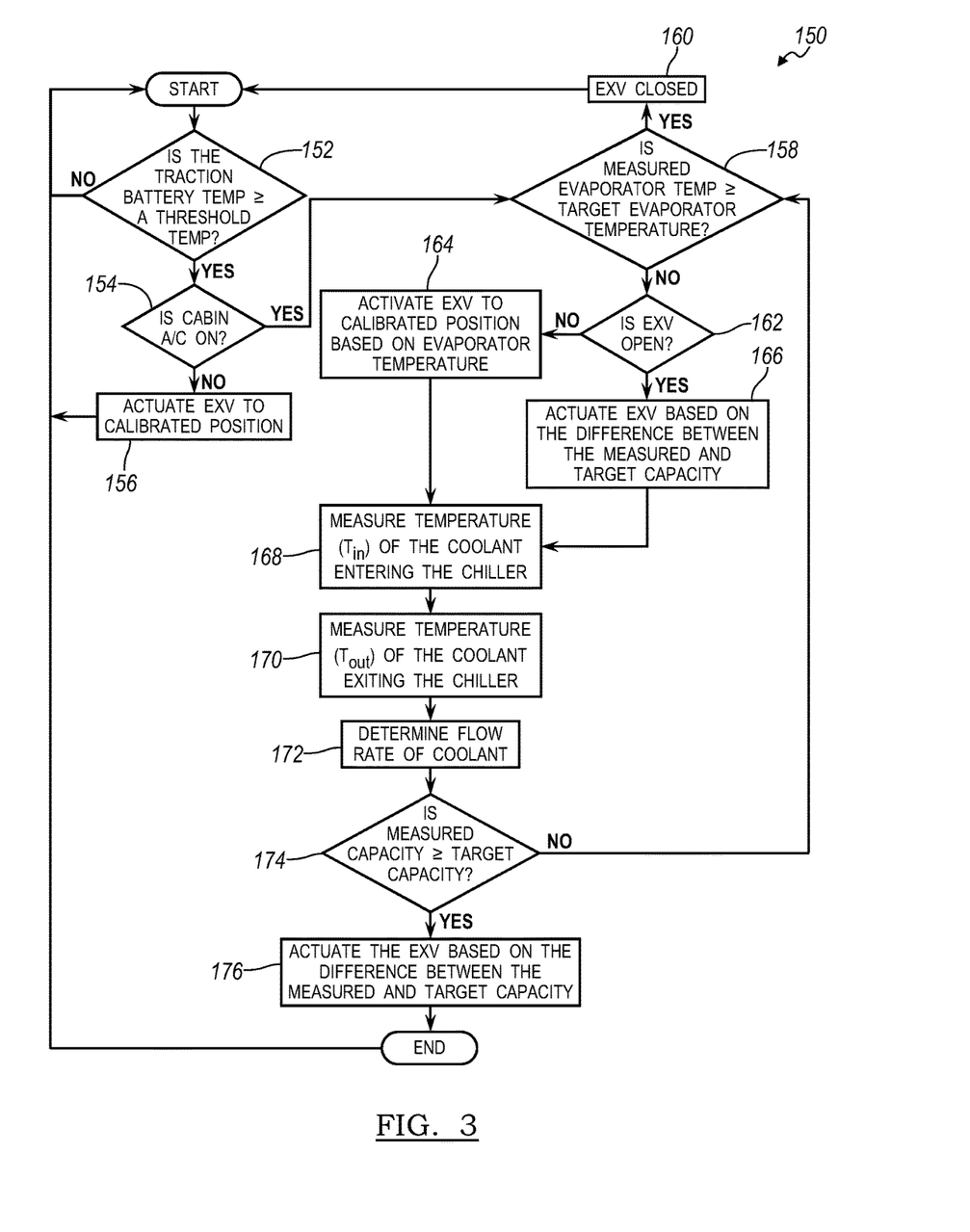
FIG. 3 is a flow chart illustrating logic for controlling an electronic expansion valve associated with a battery chiller.

FIG. 3 is a flowchart 150 of an algorithm for controlling the EXV 92 when the battery is being cooled by the chiller 90. At operation 152 the controller determines if the traction battery temperature is greater than or equal to an upper threshold temperature. If no, the battery does not require cooling via the chiller and control loops back to the start. If yes, the controller next determines if cabin air conditioning is being requested by an occupant of the vehicle. If the air conditioning is OFF, control passes to operation 156 and the EXV 92 is actuated to a calibrated position based on battery needs. If the air conditioning is ON, control passes to operation 158 and the controller determines if a measured evaporator temperature is greater than or equal to a target evaporator temperature. The target evaporator temperature may be the upper limit temperature, such as between 6 and 10 degrees Celsius, that insures the refrigerant system has capacity to cool the cabin. If the measured evaporator temperature is above the target temperature, then the air blowing into the cabin will be warmer than request by the occupants, which is undesirable. If the measured evaporator temperature exceeds the target evaporator temperature, control passes 160 and the EXV 92 is closed or remains closed because the refrigerant system does not have any capacity for taking on battery heat via the chiller 90. The vehicle may include other controls utilized during emergency situations that prioritize battery cooling over cabin cooling. In these strategies the EXV may be opened even through the evaporator temperature exceeds the target.

If yes at operation 158, control passes to operation 162 and the controller determines if the EXV 92 is open. If no, control passes to operation 164 and the chiller is activated to a calibrated position. The controller 100 may include one or more lookup tables containing a plurality of calibrated positions that are set to provide a target chiller capacity. The target chiller capacity may be based on the measured evaporator temperature from operation 158. The measured chiller capacity may also be based on the temperature difference between a target battery temperature and the coolant temperature exiting the chiller (Tout). The target chiller capacity is the expected temperature difference between the battery and Tout. If yes at operation 162, control passes to operation 166 and the position of the EXV is adjusted based on a temperature of the battery coolant as will be described in more detail below.

At operation 168 the controller measures a temperature ($T_{in}$) of the coolant entering the chiller, and at operation 170 the controller measures the temperature ($T_{out}$) of coolant exiting the chiller. For example, the controller 100 receives signals from the temperature sensors 110 and 112 in order to determine the measured temperatures of the coolant. At operation 172 the controller determines the flow rate of the coolant in the battery coolant subsystem 54. The flowrate may be inferred from the pump 104, or the system may include a flowrate sensor. Using the measured values from operations 168 through 172, the controller is able to calculate a measured chiller capacity using equation 1. At operation 174 the controller determines if the measured chiller capacity is greater than or equal to the target capacity. If yes, too much heat from the battery is being transferred into the refrigerant subsystem. At operation 176 the opening of the EXV is adjusted (i.e., the opening is reduced) based on the difference between the measured and target capacities. If no at operation 174, control passes back to operation 158 and the controller determines if the measured evaporator temperature is greater than or equal to the target evaporator temperature.

If yes at operation 158, control passes to operations 166 as the EXV is already open. At operation 166, the controller actuates the EXV (i.e., the opening of the EXV is increased) based on the difference between the measured and target capacities. Once the EXV is actuated, control passes to operations 168 through 176. This algorithm may be repeated at predetermined intervals until the controls are exited.

Figure 4:
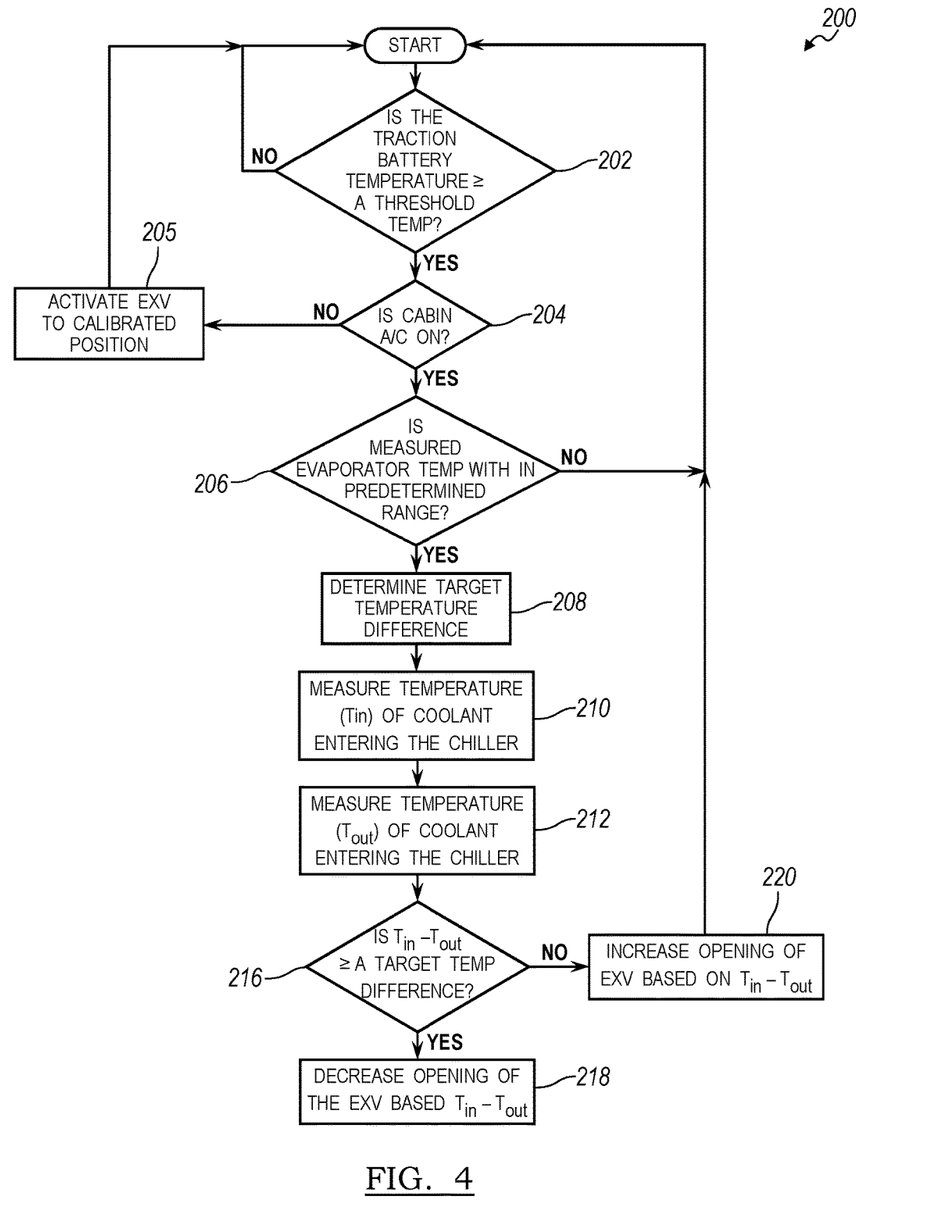
FIG. 4 is another flow chart illustrating logic for controlling an electronic expansion valve associated with a battery chiller.

FIG. 4 is a flowchart 200 of another algorithm for controlling the EXV 92 when the battery is being cooled by the chiller 90. This algorithm is similar to that of flowchart 150, in that, the controller modulates the position of the EXV based on the temperature of the coolant. At operation 202 the controller determines if the traction battery temperature is greater than or equal to a threshold temperature. If no, battery cooling is not required by the chiller and control loops to the START. If yes, control passes to operation 204 and the controller determines if the cabin AC is ON. If the AC is OFF, control passes to operation 205 and the EXV is actuated to a calibrated position based on battery demand. If the AC is ON, control passes to operation 206 and the controller determines if the measured evaporator temperature is within an operational range of temperatures. If the measured evaporator temperature is too hot, or too cold, control passes back to the start.

If the measured evaporator temperature is within the operational range, control passes operation 208. Rather than programming the controller to compare a measured chiller capacity to a target chiller capacity in order to control the EXV 92, the controller can be programmed to calculate a target temperature difference between coolant entering the chiller $T_{in}$ and coolant exiting the chiller $T_{out}$ using equation 1 with a target chiller capacity being used as Q. Since Q, ṁ (the pump may have a single speed making ṁ a constant, or ṁ could be determined prior to operation 208), and $C_p$ are constants, the controller can determine a target $|T_{in}-T_{out}|$ value, which is done at operation 208. The target temperature difference may be determined based on the optimum battery operating temperature (OptBat) and the temperature of the coolant exiting the chiller ($T_{out}$). In one embodiment, target temperature difference is OptBat−$T_{out}$.

At operations 210 and 212 the controller measures the coolant temperatures via the sensors and determines $T_{out}$ and $T_{in}$. At operation 216 controller determines if the measured temperature difference is greater than or equal to the target temperature difference. If yes, the opening of the EXV92 is decreased based on |$T_{in}$−$T_{out}$| at operation 218. If no, the opening of the EXV is increased based on |$T_{in}$−$T_{out}$| at operation 220.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A climate-control system for a vehicle comprising:
    a refrigerant subsystem including a chiller and an electronic expansion valve (EXV) arranged to selectively route refrigerant to the chiller;
    a coolant subsystem including conduit arranged to circulate coolant through a traction battery and the chiller, and including a first temperature sensor configured to measure coolant circulating into an inlet side of the chiller and a second temperature sensor configured to measure coolant circulating out of an outlet side of the chiller; and
    a controller configured to, in response to the battery exceeding a threshold temperature and cabin air conditioning being requested, command opening of the EXV to a predetermined position and adjust the position based on a measured coolant temperature difference between the first temperature sensor and the second temperature sensor.

2. The climate-control system of claim 1, wherein the refrigerant subsystem further includes an evaporator having a third temperature sensor.

3. The climate-control system of claim 2, wherein the predetermined position is based on a signal output by the third temperature sensor.

4. The climate-control system of claim 2, wherein the predetermined position is further based on a temperature of the traction battery.

5. The climate-control system of claim 1, wherein the position of the EXV is increased in response to the measured coolant temperature difference between the first and second temperature sensors being below a target temperature difference.

6. The climate-control system of claim 5, wherein the position of the EXV is decreased in response to the measured coolant temperature difference between the first and second temperature sensors exceeding a target temperature difference.

7. The climate-control system of claim 1, wherein the position of the EXV is gradually opened from a closed position to the predetermined position over a predetermined duration of time in response to the opening command.

8. The climate-control system of claim 2, wherein the refrigerant subsystem further includes a compressor, and a condenser arranged between the compressor and the evaporator.

9. The climate-control system of claim 1, wherein the coolant subsystem further includes a supply conduit connected to an inlet side of the chiller, and a return conduit connected to an outlet side of the chiller, and wherein the first temperature sensor is disposed on the supply conduit and the second temperature sensor is disposed on the return conduit.

10. A vehicle comprising:
    a refrigerant system including a chiller and an electronic expansion valve (EXV) arranged to selectively route refrigerant to the chiller;
    a coolant system arranged to circulate coolant through a traction battery and the chiller; and
    a controller configured to, in response to the EXV being open and cabin air conditioning being requested, adjust an opening of the EXV based on a difference between a measured chiller capacity and a target chiller capacity.

11. The vehicle of claim 10, wherein the coolant system further includes chiller inlet and outlet coolant temperature sensors.

12. The vehicle of claim 11, wherein the measured chiller capacity is computed based on signals received from the inlet and outlet coolant temperature sensors.

13. The vehicle of claim 10, wherein the controller is further programmed to open the EXV to a predetermined position in response to the battery exceeding a threshold temperature.

14. The vehicle of claim 10, wherein the opening of the EXV is increased in response to the measured chiller capacity being below the target chiller capacity.

15. The vehicle of claim 14, wherein the opening of the EXV is decreased in response to the measured chiller capacity exceeding the target chiller capacity.

16. A method of controlling a vehicle climate system including a chiller arranged to transfer heat between a refrigerant subsystem and a battery-coolant subsystem, the method comprising:
    opening an electronic expansion valve, associated with the chiller and configured to control refrigerant to the chiller, to a predetermined position in response to a battery exceeding a threshold temperature; and
    adjusting the position based on a measured coolant temperature difference between chiller inlet and outlet coolant temperatures.

17. The method of claim 16 further comprising increasing an opening of the electronic expansion valve in response to the measured coolant temperature difference being below a desired temperature difference.

18. The method of claim 17 further comprising decreasing the opening of the electronic expansion valve in response to the measured coolant temperature difference exceeding the desired temperature difference.

19. The method of claim 16, wherein the predetermined position is based on an outlet temperature of an evaporator of the refrigerant subsystem.

\* \* \* \* \*